United States Patent [19]
Bessho

[11] 3,710,987
[45] Jan. 16, 1973

[54] INJECTION MOLDING MACHINE FOR THERMO-SETTING PLASTICS

[75] Inventor: Michio Bessho, Himeji-shi, Hyogo-ken, Japan

[73] Assignee: Kawasaki Yuko Kabushiki Kaisha, Hyogo-ken, Japan

[22] Filed: April 15, 1971

[21] Appl. No.: 134,377

[30] Foreign Application Priority Data

| April 18, 1970 | Japan | 45/33117 |
| April 18, 1970 | Japan | 45/33118 |
| June 18, 1970 | Japan | 45/53274 |
| June 18, 1970 | Japan | 45/60904 |
| July 17, 1970 | Japan | 45/72004 |

[52] U.S. Cl. ................222/386, 425/242, 425/244, 222/146 H

[51] Int. Cl. .............................................B29f 1/02

[58] Field of Search.....18/30 QM, 30 QD, 30 QP, 30 QQ, 18/30 QT, 30 QE, 30 AM, 30 AA, 30 AC, 30 AP, 12 P, 30 R; 277/15, 16, 70, 71, 72, 115, 188, 212 F, 212 R; 425/242, 244; 222/386

[56] References Cited

UNITED STATES PATENTS

| 3,457,606 | 7/1969 | Posch | 18/30 AM X |
| 2,795,195 | 6/1957 | Amblard et al. | 277/188 X |
| 3,006,413 | 10/1961 | Brown | 277/188 X |
| 3,231,656 | 1/1966 | Ninneman | 18/30 QT X |
| 2,587,930 | 3/1952 | Uschmann | 18/12 P |
| 2,213,699 | 9/1940 | Gillis et al. | 277/16 X |
| 3,357,706 | 12/1967 | Wilkinson | 277/15 |

FOREIGN PATENTS OR APPLICATIONS

| 1,181,018 | 0/1959 | France | 18/30 HB |
| 799,672 | 0/1958 | Great Britain | 18/30 QZ |

*Primary Examiner*—J. Spencer Overholser
*Assistant Examiner*—David S. Safran
*Attorney*—Oldham & Oldham

[57] ABSTRACT

In the injection molding of thermosetting plastic the tendency of the plastic to harden in the injection cylinder can be successfully reduced, according to the invention, by minimizing the frictional engagement of the plunger with the bearing member therefore and incorporating appropriate fluid passage means in the plunger and the bearing member so as to prevent any overheating of the thermosetting plastic in the injection cylinder. Annular weir means formed on the cylinder wall serves to cause fluidal motion of the plastic uniform throughout the entire cylinder space, preventing any undesirable temperature gradient therein.

1 Claim, 4 Drawing Figures

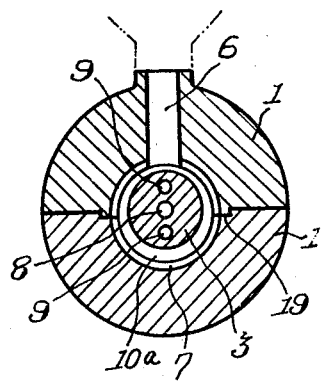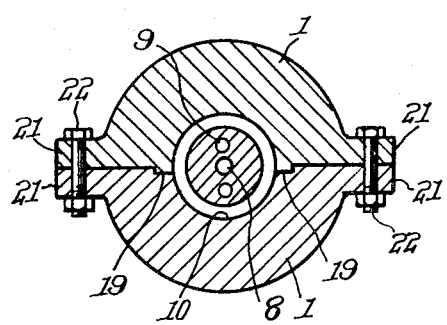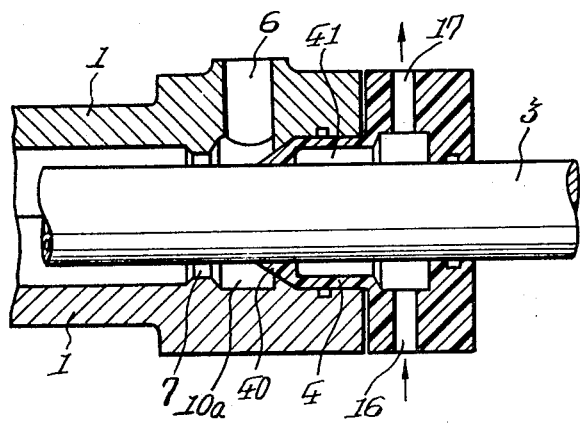

INJECTION MOLDING MACHINE FOR THERMOSETTING PLASTICS

This invention relates to injection molding machines and more particularly to plunger type machines adapted for the injection molding of thermosetting plastics including fiber glass reinforced plastics.

The invention is designed to prevent the hardening of thermosetting plastic material in the injection cylinder of the machine by minimizing the frictional heat due to the sliding movement of the plunger and preventing occurrence of any substantial temperature gradient in the plastic within the injection cylinder.

Accordingly, one object of the present invention is to make the diameter of the plunger substantially smaller than the bore diameter of the injection cylinder while allowing the plunger to make sliding engagement solely with the internal periphery of a tubular packing or bearing sleeve fitted in the base portion of the injection cylinder thereby to reduce the production of frictional heat to a minimum.

Another object of the present invention is to enhance the sealing effect of such tubular packing by shaping its inner end as a conical lip surrounding the plunger and yieldable into close contact therewith under the pressure of the plastic material fed in the injection cylinder.

A further object of the present invention is to maintain the plunger at an appropriate temperature by forming in the plunger body a fluid passage means for circulation of either a heating or a cooling fluid through the plunger with the intention of preventing any overheating of the plastic material in the injection cylinder.

Yet another object of the invention is to make it easy to clean the interior of the injection cylinder by forming the latter as a longitudinally split structure comprising two half cylinder sections clamped together.

Another object of the present invention is to maintain the annular plunger-bearing packing member at an appropriate temperature by forming therein a cavity adapted to receive an appropriate cooling liquid to prevent any substantial heating of the packing and hence of the plastic material.

Another object of the present invention is to impart to the plastic material in the injection cylinder fluidal motion uniform throughout the space therein to help prevent occurrence of any substantial temperature gradient in the plastic material, by forming an annular recess in the wall of the cylinder at its end where the plastic material is fed in and also an annular weir on the cylinder wall adjacent to the annular recess on the downstream side thereof.

These and other objects and feature of the invention will become more apparent by reference to the following description taken in conjunction with the accompanying drawings, in which:

FIG. 2 is a transverse cross section of same taken along the line II—II in FIG. 1;

FIG. 3 is a cross section taken along the line III—III in FIG. 1; and

FIG. 4 is a longitudinal cross sectional view showing a modified form of tubular packing member arranged between the plunger and the injection cylinder, on an enlarged scale.

Figure 1:
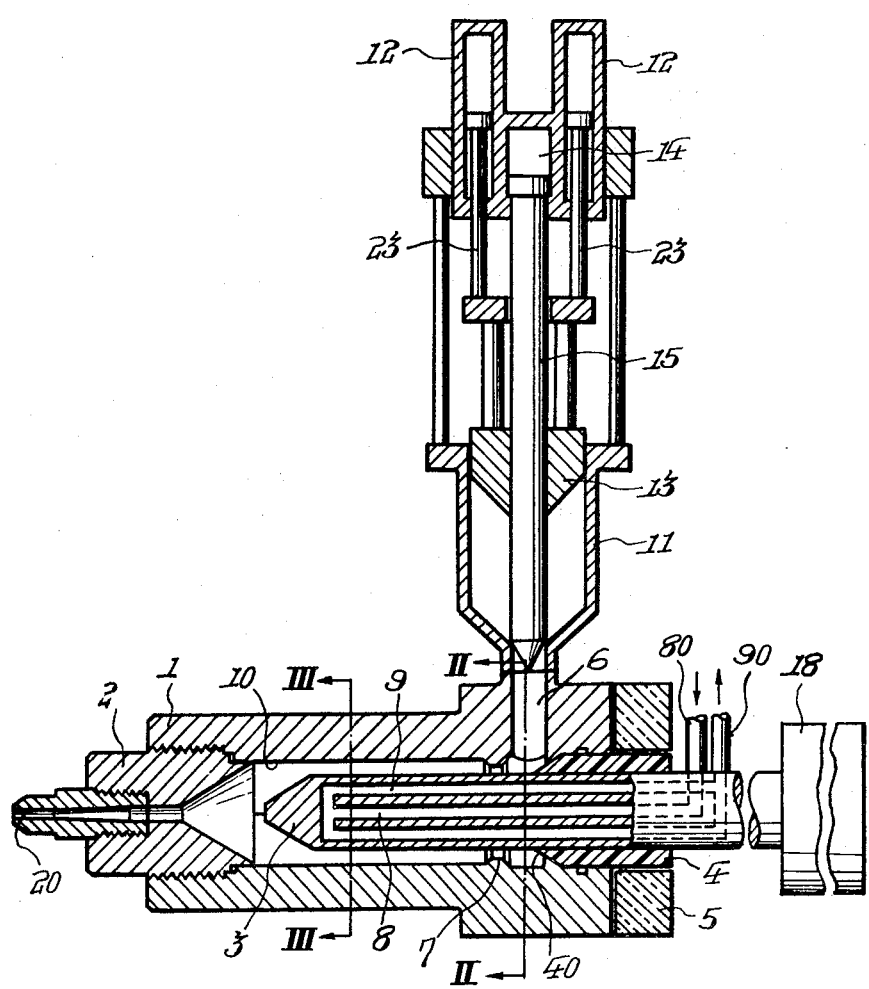
FIG. 1 is a vertical longitudinal cross-sectional view of an injection molding machine embodying the principles of the present invention.

In the drawings, reference numeral 1 indicates an injection cylinder of the longitudinally split type including the two half sections positioned relative to each other by interengaging stepped portions 19, as shown in FIGS. 2 and 3, to form an internal bore 10. Reference numeral 21 in FIG. 3 indicates longitudinally extending flanges formed on the cylinder sections and clamped together by bolt means 22. Fixed to the forward end of the cylinder 1 is an end piece 2 having an injection orifice 20 formed therein. Arranged axially in the cylinder bore 10 is a plunger 3, which has a diameter substantially smaller than that of the cylinder bore 10 and is reciprocable longitudinally thereof. The reciprocatory motion of the plunger is given thereto by an appropriate drive means such as an oil hydraulic actuator 18.

A tubular packing or bearing sleeve member 4 is interfitted between the base portion of the injection cylinder 1 and the plunger 3 and held in place by means of a flange member 5 secured to the adjacent end of the cylinder 1. The packing member 4 is formed of elastic material such as elastic rubber or synthetic resin and at its inner end forms an annular lip 40 encircling the peripheral surface of the plunger in contact therewith and having a conical outer periphery, as shown in FIG. 1. The packing lip 40 is located adjacent to the inner end of a resin inlet port 6 formed in the base portion of the cylinder 1 and communicating with a feed hopper 11. It will be seen that the annular packing lip 40 is yieldable under the pressure of plastic material fed from the hopper 11 to fit closely to the peripheral surface of the plunger 3, thereby enhancing the sealing effect of the packing member 4.

The internal wall of the injection cylinder 1 is formed with an annular weir 7 defining an annular recess 10a adjacent to the opening of the inlet port 6, through which plastic material is fed into the cylinder 1 from the feed hopper 11. The provision of the annular weir 7 and recess 10a ensures that the plastic material fed into the cylinder 1 through the inlet port 6 is forwarded from the base portion of the cylinder to its forward end having injection orifice 20 with an optimized fluidal motion. In other words, the flow of plastic material through the cylinder is subjected to a considerable resistance due to the presence of annular weir 7 and this causes the plastic material fed first to fill the annular recess 10a upstream of the weir and thence be forced to pass over the latter into the main cylinder space toward its orifice end in a uniform fashion around the entire periphery of the annular weir 7. In this connection it is preferred that the weir 7 is formed eccentrically with respect to the cylinder bore 10 and the plunger 3 coaxial therewith so as to present a larger resistance to the resin flow in the radial region adjacent to the inlet port 6 than in the region remote therefrom, as shown in FIG. 2.

Referring to FIG. 1, the plunger 3 is formed therein with fluid passages 8 and 9 coaxial with each other, and communicating respectively with a fluid supply conduit 80 and a fluid discharge conduit 90. The fluid supply conduit 80 is interchangeably connected with a source of heating medium such as steam and a source of cooling medium such as water for circulation of either the heating or the cooling medium through the passages 8 and 9 as desired to heat or cool the plastic material fed in the injection cylinder 1 to an appropriate temperature through the intermediary of the plunger 3 for the purpose of imparting a desired fluidity to the plastic material.

Referring again to FIG. 1, a ram member 13 is fitted in the feed hopper 11 communicating with the inlet port 6 of the injection cylinder 1 and is vertically movable under the control of a hydraulic cylinder 12 by way of piston rods 23. A stopper rod 15, extending axially through the ram 13, is operable under the control of another hydraulic cylinder 14 to open and close the inlet port 6.

A modification of the annular packing member 4 is shown in FIG. 4. The modified form of packing 4 is formed as shown with a cavity 41, which communicates with a supply port 16 and a discharge port 17 also formed in the member 4. It will be seen that with this modification the conical lip formation 40 on the packing member can be kept substantially free from any temperature gradient by forced circulation of an appropriate cooling fluid through the supply port 16, cavity 41 and discharge port 17. This apparently helps to prevent formation of any hardened film of plastic material otherwise occurring under the heat of friction between the plunger 3 and packing member 4.

Description will now be made of the operation of the injection molding machine described above.

First with the ram 13 removed out of the feed hopper 11 and the stopper rod 15 raised to open the inlet port 6, plastic material is thrown into the feed hopper 11 and thereafter the ram 13 is slowly lowered under the control of the hydraulic cylinder 12 to feed the material into the injection cylinder 1. On this occasion, it is to be understood that the plunger 3 is held retracted rightwards as viewed in FIG. 1 by means of the actuator 18.

Next, with the inlet port 6 closed by the stopper rod 15, the nozzle 20 is applied to a previously set injection mold not shown and the plunger 3 is forwarded under the drive of the actuator 18 to pressurize the plastic filled in the injection cylinder 1 in a state sealed therein. The resin pressure thus built up in the cylinder 1 acts to press the conical lip portion 40 of the annular packing member 4 closely against the plunger 3, thus enhancing the sealing effect of the packing member 4 upon the peripheral sliding surface of the plunger 3. Under this circumstance, the plastic resin fed in the injection cylinder 1 is forced under a proper injection pressure into the mold through the nozzle orifice 20.

Upon completion of the injection operation, the stopper rod 15 is raised and the ram 13 is slowly lowered while the plunger 3 is retracted again to feed the injection cylinder 1 with plastic material in preparation for the next cycle of operation.

It will of course be apparent to those skilled in the art that the invention is not restricted to the features described above and shown in the drawings but may be varied in many ways within the scope of the appendant claims.

I claim:

1. An injection molding machine, for thermosetting plastics, of the type including an injection cylinder, a plunger slidably fitted in said injection cylinder, and an injection nozzle fixed to one end of said injection cylinder, characterized in that the plunger has an outer diameter substantially smaller than the internal diameter of the injection cylinder to define an annular space of an appropriate size between the plunger and the internal wall of the injection cylinder, that an annular packing member formed of elastic material is fitted in the base end portion of the injection cylinder for slidable fitting engagement with the peripheral surface of the plunger and is formed at the inner end with an externally conical lip yieldable under the pressure of the plastic material fed in the injection cylinder to closely seal the peripheral surface of the plunger, and said injection cylinder being formed on the internal wall thereof with an annular recess communicating with a resin inlet port formed in the cylinder wall at the feed end of said injection cylinder, and with an annular weir adjoining to said annular recess on the downstream side thereof.

* * * * *